(12) United States Patent
Materne

(10) Patent No.: US 6,445,098 B1
(45) Date of Patent: Sep. 3, 2002

(54) CAN FOR A SYNTHETIC PUMP MOTOR

(75) Inventor: Thomas Materne, Lüdinghausen (DE)

(73) Assignee: Wilo GmbH, Dortmund (DE)

( * ) Notice: Subject to any disclaimer, the term of this patent is extended or adjusted under 35 U.S.C. 154(b) by 0 days.

(21) Appl. No.: 09/491,679

(22) Filed: Jan. 26, 2000

(30) Foreign Application Priority Data

Jan. 27, 1999 (DE) .......................... 199 03 078

(51) Int. Cl.$^7$ .............................. H02K 5/16; H02K 5/12; F04B 17/03
(52) U.S. Cl. ............................ 310/89; 310/90; 310/42; 417/423.14; 384/215
(58) Field of Search ................ 123/41, 44; 417/366, 417/423.14; 310/90, 42, 89; 384/192, 193, 202, 215, 236, 240, 428

(56) References Cited

U.S. PATENT DOCUMENTS

| 4,049,984 A | * | 9/1977 | Ishii et al. ............... 310/42 |
| 5,076,453 A | | 12/1991 | Odet ....................... 215/252 |
| 5,218,256 A | * | 6/1993 | Umezawa et al. ......... 310/90 |
| 5,344,892 A | * | 9/1994 | Natarajan et al. ........ 525/397 |
| 5,769,603 A | * | 6/1998 | Fujiwara et al. ........ 415/169.1 |
| 5,785,013 A | | 7/1998 | Sinn et al. ............. 123/41.44 |
| 5,820,807 A | | 10/1998 | Urmston .................. 264/318 |
| 5,838,081 A | | 11/1998 | Greentaner ............... 310/90 |
| 5,945,756 A | * | 8/1999 | Periyathamby et al. ... 310/89 |
| 6,091,174 A | * | 7/2000 | Genster ................... 310/89 |
| 6,229,240 B1 | * | 5/2001 | Kech et al. ............. 310/194 |

FOREIGN PATENT DOCUMENTS

| DE | 1 116 060 | 10/1961 |
| DE | 2 245 009 | 4/1974 |
| DE | 37 07 600 | 9/1988 |
| DE | 89 05 650 | 9/1989 |
| DE | 0 530 786 | 9/1992 |
| DE | 92 10 023 | 11/1992 |
| DE | 92 10 023.6 | 12/1992 |
| DE | 295 04 023 | 8/1999 |
| FR | 2583466 | 12/1986 |
| GB | 2152294 A | 7/1985 |
| JP | 60-154025 | 8/1985 |

* cited by examiner

Primary Examiner—Nestor Ramirez
Assistant Examiner—Judson H. Jones
(74) Attorney, Agent, or Firm—Herbert Dubno

(57) ABSTRACT

A cap of synthetic resin material for separating the wet and dry spaces of a motor/pump assembly and receiving the rotor of the motor has, at a bottom of the cap remote from the pump, a seat formed by axially-extending centering elements and detent arms which snap onto one of the bearings of the motor shaft and form-fittingly that retains that bearing in the axial and radial directions and prevents rotation thereof.

10 Claims, 3 Drawing Sheets

CAN FOR A SYNTHETIC PUMP MOTOR

FIELD OF THE INVENTION

My present invention relates to a so-called can for a centrifugal pump motor and, more particularly, to a cup-shaped member which is located between the rotor and stator of an electric motor, especially a motor driving a centrifugal pump and particularly a motor driving a centrifugal pump for the circulation of water in a heating or cooling system and which separates a wet side from a dry side of the pump and motor. The invention is directed, therefore, to a cup which serves in a canned motor-pump assembly to confine a liquid which may serve to cool the electric motor and which communicates with the pump portion of the assembly for that purpose. More particularly this invention concerns a "can" or "cup" which the usually, but not necessarily, is composed of a synthetic resin material, can receive at least one and preferably both bearings journaling the motor shaft, surrounds the rotor of the motor, and separates the rotor space from the stator space which surrounds the cup. The invention also relates to a device for and a method of making the cup by injection-molding of a synthetic resin.

BACKGROUND OF THE INVENTION

So-called motor-pump systems are generally known. With such pumps, operating in accordance with the wet-running principle, a cup separates the wet space from the dry space in the motor driving the pump. The cup has usually been composed of metal, hence the term "can," although it can be made of synthetic resin. The cup serves to receive the entire rotor assembly in most cases comprising the rotor, its shaft, and ball, roller or plain (slide) bearings.

Reference may be had, for example, to the commonly-owned copending application Ser. No. 09/202,696 filed Dec. 17, 1998, (now U.S. Pat. No. 6,091,174) and the following commonly-assigned copending applications: Ser. No. 09/320,906 filed May 27, 1999 and Ser. No. 09/410,002 filed Sep. 30, 1999 (now U.S. Pat. No. 6,229,240).

The fabrication of the cup from synthetic resin has the advantage that it can be of lighter weight and can be fabricated less expensively and, because of the lighter weight, the motor efficiency can be greater.

When the cup is fabricated from metal, a seat for a bearing is provided at a bottom of the cup in the form of a metal sleeve or by imparting a bearing-receiving shape to the cup so that it is integrated in the cup. A radial bearing is generally press-fitted in the bearing seat and has an outer shape which corresponds to that of the metal sleeve or the configuration of the seat imparted directly to the cup so that a force-fit between the bearing outer race and the seat is ensured.

When the cup is formed from synthetic resin, however, a variety of problems can arise. For example, the synthetic resin material may relax in operation to relieve a press-fit between the bearing and the seat. As high temperatures arise in the motor/pump assembly, the press-fit can be lost because of the difference in the thermal coefficients of expansion of the bearing and the cup.

Even when the assembly is used at low temperatures, drawbacks are encountered in the use of a synthetic resin cup to separate the rotor assembly from the stator space. The different coefficients of thermal expansion of the bearing and cup give rise to increased forces between the cup and the bearing in the pressing zone which can lead to rupture of the bearing seat.

OBJECTS OF THE INVENTION

It is, therefore, the principal object of the present invention to provide an improved structurally simple low-cost and easily-handled cup for the purposes described that can operate reliably for long periods of time without the danger of separation of the bearing from its seat.

Another object of this invention is to provide an improved cup for a so-called canned motor/pump (circulating or centrifugal pump) assembly whereby drawbacks of earlier cups composed of synthetic resin are obviated.

It is also an object of this invention to provide a method of simply and economically fabricating the improved cup.

It is also an object of this invention to provide a device for carrying out that method, i.e. for producing an economically, reliable and long-lived cup for enclosing the rotor assembly of an electric motor.

SUMMARY OF THE INVENTION

These objects and others which will become apparent hereinafter are attained, in accordance with the invention, in a cup for a canned circulating pump or synthetic pump, i.e. for a motor/pump assembly, which is at least predominantly composed of synthetic resin and wherein at least one bearing journaling the motor shaft is disposed wherein at least the bottom of the cup is formed with a bearing seat in which a bearing axially, radially and torsionally form-fittingly is retained in the cup. The term "torsionally retained" is intended to mean that the outer race of the bearing is held in the cup form-fittingly without rotation therein.

It is important, therefore, that at least at the bottom of the cup a bearing be held form-fittingly therein in the axial sense, in the radial sense and torsionally. The form-fitting connection in the axial sense means that the bearing cannot shift in the axial direction while the radial retention means that there is no significant radial play between the bearing and the synthetic resin cup either. Although the bearing is not press-fitted into the seat, it forms a transition fit or low-play fit therewith.

This permits the cup to be of a relatively simple construction from a synthetic resin material but which is capable of retaining the bearing and the cup even with highly fluctuating temperatures in a reliable manner with a transition or slight-play fit between the bearing and the synthetic resin cup. The different coefficients of thermal expansion between the bearing and the cup do not give rise to the aforedescribed problems. The handling, for example, of the assembly, is simple and the cup can be fabricated in an economical manner.

It has been found to be especially advantageous to form the radial bearing which is remote from the pump so that it can be snapped form-fittingly into the bottom of the cup. In this way, the mounting of the bearing is both rapid and simple.

The snap connection can be formed in an especially simple manner by providing at least one retaining arm which is elastically biased outwardly in a radial direction and extends axially in a direction toward the pump and has a radially-inwardly extending projection or finger for engagement behind the radial bearing as it is snapped into its seat. Preferably four such detent arms are provided in an angularly-equispaced relationship around the axis of the radial bearing and for their projections extending inwardly and diametrically opposite each other in pairs.

The detent arms can be easily pressed outwardly during mounting of the bearing when the projections, on their sides turned toward the pump are beveled to form a ramp which presses the arms outwardly. The end of the bearing turned away from the pump can be beveled similarly for this purpose. A defined axial positioning of the bearing can be obtained when, at the bottom of the cup a shoulder or pedestal is provided which lies against the face of the bearing turned away from the pump. A defined radial positioning of the bearing is ensured by forming the body of the cup with axially-extending rigid centering elements for the radial centering of the radial bearing. A rotation of the bearing or of the outer race can be prevented in a simple manner by having the projections of the detent arms form-fittingly engaged in respective recesses of the radial bearing.

It is advantageous to form the detent arms and/or the centering elements in one piece with the remainder of the cup by injection-molding or casting them as part of the bottom of the cup. This eliminates the need for additional mounting space to provide such elements on the cup. A device for making the cup of the invention by injection-molding comprises a pair of mutually coaxial cores located one inside another and axially shiftable relative to one another into a removal position and angularly-disposable relative to one another in the removable position.

With such cores and an outer mold member, the injection-molding form can be provided to simply inject the cup with the undercuts on the projections. The cores should, for this purpose, be movable relative to one another axially with a displacement which is equal to the length of the detent arm or centering element.

It is especially advantageous when the outer core defines the radial lateral flanks, the free end faces and the radial outwardly surfaces of the detent arms and centering elements while the inner core defines the radially-inwardly surfaces of the indexing arms and centering elements as well as the undersides of the projections, i.e. the undercuts. With such a molding die the cup can be produced economically and simply by injection molding and for removal of the cup. Initially the outer core is retracted by at least the length of the detent arms or centering elements to provide a free space for the detent arms to be deflected outwardly. Then the inner core is rotated through an angle corresponding to the peripheral width of the projection to bring the ledge of the inner core which formerly was positioned beneath each projection into spaces between projections or adjacent the detent arms. Then the inner form or core is retracted axially. The cup can then be removed from the outer mold body defining its external shape.

BRIEF DESCRIPTION OF THE DRAWING

The above and other objects, features, and advantages will become more readily apparent from the following description, reference being made to the accompanying drawing in which.

SPECIFIC DESCRIPTION

Figure 7:
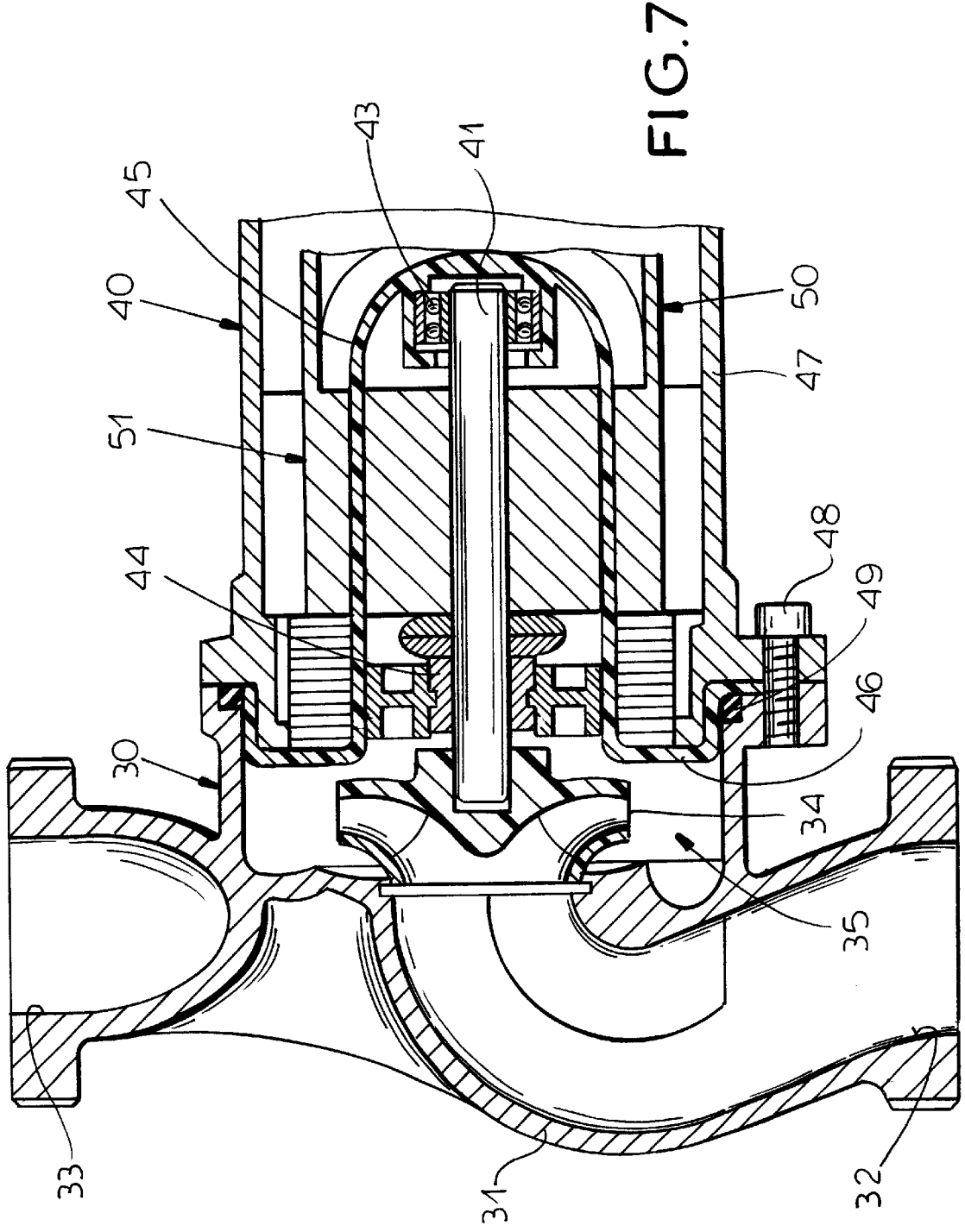
FIG. 7 is a cross sectional view through a motor-pump assembly embodying the cup of FIGS. 1–6.

In FIG. 7 I have shown a motor/pump system for use of a circulator in a heating system which comprises a pump 30 and a motor 40. The pump comprises a pump housing 31 with an inlet 32 and an outlet 33, an impeller 34 serving to displace the circulated hot water from the inlet to the outlet utilizing a centrifugal pump press. The impeller 34 is mounted on a shaft 41 of a rotor assembly which comprises the armature 42 of the motor, a pair of bearings 43 and 44 supporting that shaft and a "can" or cup 45 of a plastic injection molded with a seat 46 receiving a bearing 43 at the bottom end of the cup. At its end turned toward the pump, the cup 45 has a flange 46 clamped between the housing 31 and a casing 46 of the motor by screws 48 and a seal 49.

The cup is open to the liquid side so that liquid can flow through the rotor assembly to cool the pump. The cup also serves to isolate the wet side 35 from the dry side 50 of the motor/pump system, the dry side including a stator assembly 51.

The cup 45 is shown in FIGS. 1–6 and described in connection therewith. In FIG. 7, however, the bearing 43 is shown as a radial ball-bearing whereas in FIGS. 1–3, the bearing is shown as a plain or slide bearing.

Figure 1:
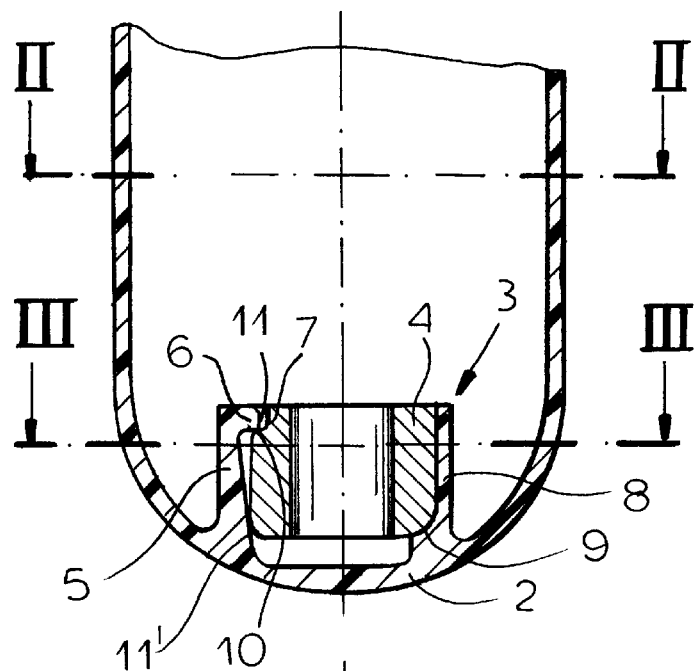
FIG. 1 is a cross sectional view through a cup for a canned centrifugal pump according to the invention showing a plain or slide bearing mounted therein, the section corresponding to a section along line I—I of FIG. 2.
Figure 2:
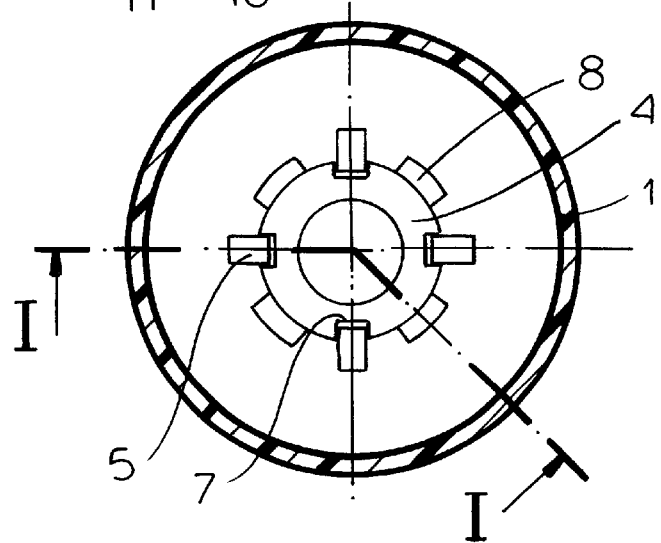
FIG. 2 is a cross section along the line II—II of FIG. 1.
Figure 3:
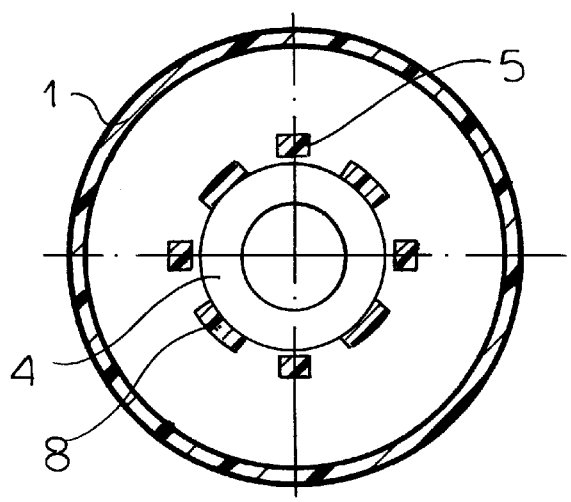
FIG. 3 is a section taken along the line III—III of FIG. 1.

As can be seen from FIGS. 1–3, the cup 1, for separating the wet and dry side of a motor driving the pump can have a bottom 2 which is generally hemispherical or ball shaped and thus provides a material saving, easily injection-molded configuration of the cup. Within the cup 1, at the bottom 2, a bearing seat is provided for receiving the radial bearing, which, in the embodiment of FIGS. 1–3, is shown as a slide or plain bearing.

The bearing seat 3 has four detent arms 5 extending axially toward the pump and tapered in the direction of the pump. The detent arms are injection molded in one piece with the bottom 2 and can be biased elastically inwardly so that, upon outward deflection, they spring back into their original positions. At their free ends, each of the four detent arms 5 is provided with a radially-inwardly extending projections 6.

Each projection 6 engages in a recess 7 formed along the exterior of the bearing 4 along an end face of this bearing. The recesses 7 can be formed during the sintering of the bearing 4 in the shaping die and thus does not require machining or any other finishing step for the bearing since the bearing does not require any since the bearing does not require any undercut. The widths of the recesses 7 correspond to the widths of the projections 6 so that the bearing 4 is held form-fittingly against rotation by the detent arm 5.

In addition to the elastically-deflectable detent arms 5, the bearing seat 3 has four angularly-equispaced rigid centering elements 8 which rest against the outer side of the bearing 4. The bearing is thus radially held and centered in a form-fitting manner. Around the bearing 4, the detent arms 5 and the centering element 5 alternate with one another. The centering elements 8 are also injection-molded on one piece on the bottom 2. At the transition between the centering elements 8 and the bottom 2, a stop 9 is formed in the centering element 8 to axially abut the end face of the bearing 4 which is turned away from the pump. In the direction toward the pump, the underside 10 of each projection 6 engages the bottom of each recess 7. Thus the bearing 4 is also fixed axially form-fittingly in a defined position.

Bevels 11 are provided at the inner sides of the projections 6 to enable the detent arms 5 to be cammed outwardly upon pressing of the bearing 4 axially into the seat. To facilitate this camming action, a correspondingly acting bevel 11' may be provided along the outer edge of the end face of the bearing 4 turned away from the pump. As soon as the bearing 4 is seated in position, the detent arms 5 spring inwardly and lock the bearing axially and against rotation.

Figure 4:
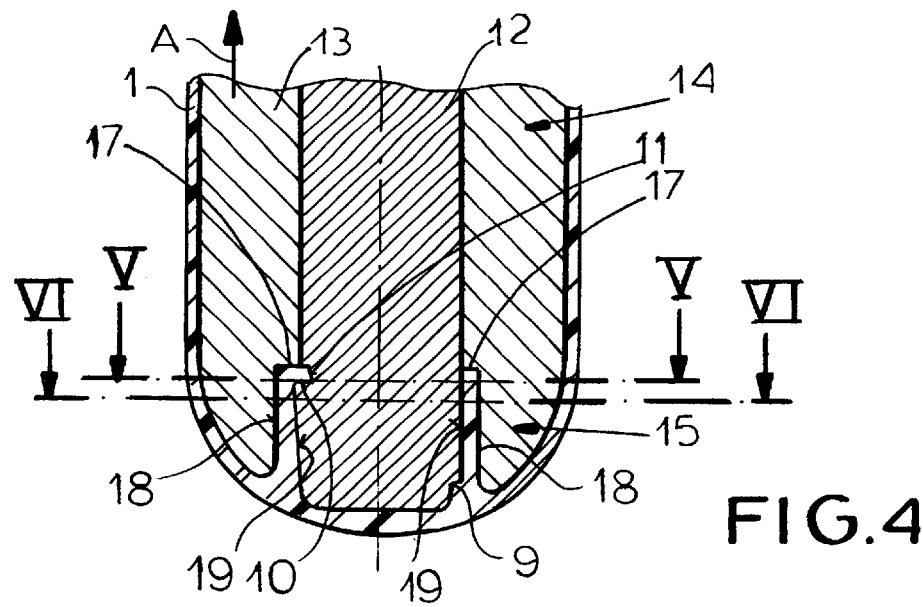
FIG. 4 is a cross sectional view showing the fabrication of a cup according to the invention and corresponding to a section along the line IV—IV of FIG. 5.
Figure 5:
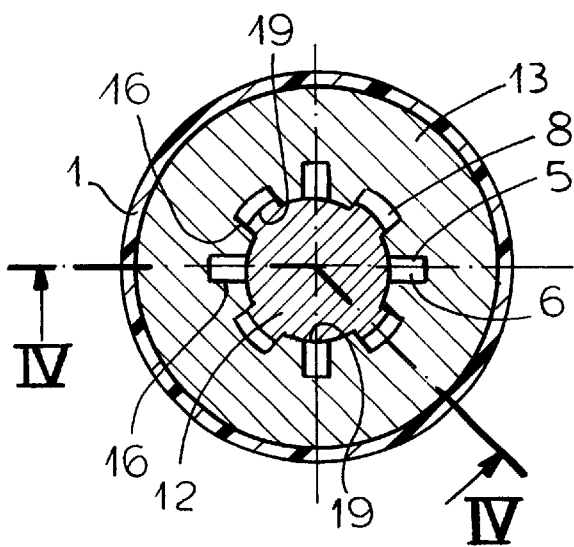
FIG. 5 is a cross sectional view along the line V—V of FIG. 4.
Figure 6:
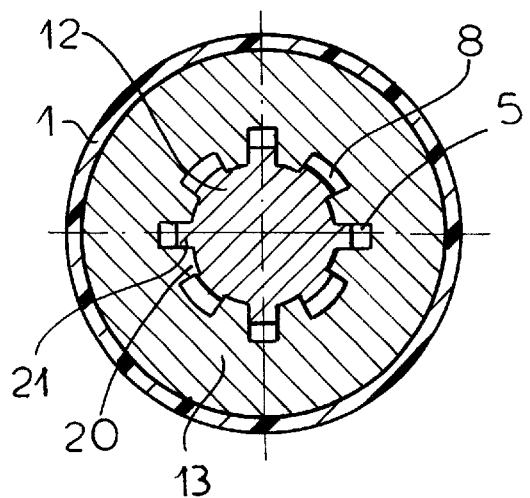
FIG. 6 is a cross sectional view taken along the line VI—VI of FIG. 4.

FIGS. 4–6 show the formation of the cup 1 with the aid of cores 12 and 13 of the injection-molding die, according to the invention. The outer mold body has not been shown. In the region 14 above the detent arms 5 and the centering elements 4, the inner core 12 is formed as a cylinder and the outer core 13 has a hollow cylinder. Both cores are coaxial with one another and to the cup 1.

In the lower region 15 the outer core 13 defines the radial lateral flanks 16, the free end flank 17 and the radial outer flank 18 of the detent arms 5 and of the centering element 8. The inner core 12 defines, the lower region 15, the radial inner flanks 19 of the detent arms 5 and the centering elements 8, the undersides 10 of the projections 6, the bevels 11 of the projections 6 and the steps 9 of the centering elements 8.

Between the detent arms 5 and the centering element 8, the outer core 13 lies against the inner core 11 and radially inwardly directed projections 20 of the outer core alternate with radially-outwardly directed projections 21 of the inner core 12 in spline-connection.

It can thus be seen that, once the outer core 13 is axially withdrawn in the direction of arrow A by the length of the arms 5/centering element 8, the inner core 12 can be rotated so that it no longer engages below the projections 6 and both cores can then be withdrawn from the cup or the cup removed from the cores.

I claim:

1. A cup for separating a wet side from a dry side in an electric motor and for enclosing a rotor of the electric motor in a motor/pump assembly, said cup being composed at least predominantly of a synthetic resin material and receiving two bearings for journaling a shaft of the motor, said cup having a bottom formed with a seat for one of said bearings and provided with means for retaining said one of said bearings form-fittingly in said seat, axially, radially and rotationally fast, and so that said one of said bearings can be snapped into said seat and into said bottom at an end of said cup remote from a ramp of said assembly, said seat being provided with at least one elastic detent arm extending axially toward said pump and radially deflectable upon insertion of said one of said bearings into said seat, said detent arm having a radially-inwardly directed projection engageable form-fittingly behind said one of said bearings, a plurality of axially extending centering elements formed on said bottom and defining said seat for radially centering said one of said bearings in said seat, one of said bearings being formed with a notch form fittingly receiving said projection.

2. A cup for separating a wet side from a dry side in an electric motor and for enclosing a rotor of the electric motor in a motor/pump assembly, said cup being composed at least predominantly of a synthetic resin material and receiving two bearings for journaling a shaft of the motor, said cup having a bottom formed with a seat for one of said bearings and provided with means for retaining said one of said bearings form-fittingly in said seat, axially, radially and rotationally fast, and so that said one of said bearings can be snapped into said seat and into said bottom at an end of said cup remote from a ramp of said assembly, said seat being provided with at least one elastic detent arm extending axially toward said pump and radially deflectable upon insertion of said one of said bearings into said seat, said detent arm having a radially-inwardly directed projection engageable form-fittingly behind said one of said bearings, a plurality of axially extending centering elements formed on said bottom and defining said seat for radially centering said one of said bearings in said seat, said arm and said centering elements being formed in one piece with said bottom of said cup, a plurality of said arms with respective projections being provided and said arms and said centering elements alternating with one another in spaced-apart relationship around said one of said bearings.

3. A cup for separating a wet side from a dry side in an electric motor and for enclosing a rotor of the electric motor in a motor/pump assembly, said cup being composed at least predominantly of a synthetic resin material and receiving two bearings for journaling a shaft of the motor, said cup having a bottom formed with a seat for one of said bearings and provided with means for retaining said one of said bearings form-fittingly in said seat, axially, radially and rotationally fast, and so that said one of said bearings can be snapped into said seat and into said bottom at an end of said cup remote from a ramp of said assembly, said seat being provided with at least one elastic detent arm extending axially toward said pump and radially deflectable upon insertion of said one of said bearings into said seat, said detent arm having a radially-inwardly directed projection engageable form-fittingly behind said one of said bearings, one of said bearings being formed with a notch form fittingly receiving said projection.

4. A cup for separating a wet side from a dry side in an electric motor and for enclosing a rotor of the electric motor in a motor/pump assembly, said cup being composed at least predominantly of a synthetic resin material and receiving two bearings for journaling a shaft of the motor, said cup having a bottom formed with a seat for one of said bearings and provided with means for retaining said one of said bearings form-fittingly in said seat, axially, radially and rotationally fast, in said seat at said bottom of said cup, said one of said bearings and said seat being configured so that said one of said bearings can be snapped into said seat and into said bottom at an end of said cup remote from a ramp of said assembly.

5. The cup defined in claim 4 wherein said seat is provided with at least one elastic detent arm extending axially toward said pump and radially deflectable upon insertion of said one of said bearings into said seat, said detent arm having a radially-inwardly directed projection egageable form-fittingly behind said one of said bearings.

6. The cup defined in claim 5 wherein said projection has at an edge and, on a side turned toward said pump, a bevel for outward camming of said arm upon insertion of said one of said bearings into said seat.

7. The cup defined in claim 5 wherein said bearing has a bevel along an end turned away from said pump for outward camming of said arm upon insertion of said one of said bearings into said seat.

8. The cup defined in claim 5 wherein said bottom of said cup is formed with a shoulder engaging an end of said one of said bearings turned away from said pump upon snapping into said one of said bearings in said seat.

9. The cup defined in claim 5, further comprising a plurality of axially extending centering elements formed on said bottom and defining said seat for radially centering said one of said bearing in said seat.

10. The cup defined in claim 9 wherein said arm and said centering elements are formed in one piece with said bottom of said cup.

* * * * *